United States Patent [19]

Flider

[11] Patent Number: 5,380,469
[45] Date of Patent: Jan. 10, 1995

[54] POLYGLYCEROL ESTERS AS FUNCTIONAL FLUIDS AND FUNCTIONAL FLUID MODIFIERS

[75] Inventor: Frank J. Flider, Schaumburg, Ill.

[73] Assignee: Calgene Chemical, Inc., Skokie, Ill.

[21] Appl. No.: 33,800

[22] Filed: Mar. 18, 1993

[51] Int. Cl.$^6$ ........................................ C10M 107/00
[52] U.S. Cl. ........................................ 252/565
[58] Field of Search .............................. 252/565

[56] References Cited

U.S. PATENT DOCUMENTS

| | | |
|---|---|---|
| 2,258,892 | 10/1941 | Harris . |
| 3,637,774 | 1/1972 | Babayan et al. ............ 260/410.6 |
| 3,742,069 | 6/1973 | Hunter . |
| 4,783,274 | 11/1988 | Jokinen et al. . |
| 4,885,104 | 12/1989 | Sturwold . |
| 5,034,144 | 7/1991 | Ohgake et al. . |
| 5,045,337 | 9/1991 | El-Nokaly et al. . |
| 5,102,567 | 4/1992 | Wolf . |
| 5,154,593 | 9/1992 | Takashima . |
| 5,185,091 | 2/1993 | Ogake et al. . |

FOREIGN PATENT DOCUMENTS 2049430 2/1992 Canada .
0508419 10/1992 European Pat. Off. .

OTHER PUBLICATIONS

R. Lewis et al, *Hawley's Condensed Chemical Dictionary*, 12th Ed. p. 935.
Journal Articles *Journal of the American Oil Chemists Society*, vol. 56, No. 11 (1979) pp. 921–924.

Primary Examiner—Prince Willis, Jr.
Assistant Examiner—Cephia D. Toomer
Attorney, Agent, or Firm—Stevens, Davis, Miller & Mosher

[57] ABSTRACT

High viscosity functional fluids prepared by reacting a polyglycerol with a triglyceride oil or fat. The reaction products can be used as high viscosity lubricants or blended with triglyceride-based functional fluids for use in mud drilling, as low temperature lubricants, cutting fluids, hydraulic fluids, and food grade lubricants.

16 Claims, 2 Drawing Sheets

PGE

POLYGLYCEROL ESTERS AS FUNCTIONAL FLUIDS AND FUNCTIONAL FLUID MODIFIERS

FIELD OF THE INVENTION

This invention relates to biodegradable functional fluids or modifiers for functional fluids such as cutting fluids, hydraulic fluids, chain saw fluids, and H-1 (i.e., food grade) lubricants.

BACKGROUND OF THE INVENTION

It is known to use polyols and natural fat- and oil-based products as lubricants. For instance, U.S. Pat. No. 4,885,104 discloses metalworking lubricants composed of a reaction product of natural fat or oil, a polyol having from 5 to 15 carbon atoms and a dicarboxylic acid having from 2 to 36 carbon atoms. The natural fat of the composition may be canola oil.

A food grade lubricant is disclosed in U.S. Pat. No. 5,185,091. The lubricant is preferably composed of decaglycerol monostearate, a triglyceride of a medium chain saturated fatty acids (of 6 to 10 carbon atoms) and glycerol. The ingredients are melted and then kneaded under rapid cooling in order to produce a desired emulsion having a specific dropping point. This product is hydrophilic and substantially insoluble in triglyceride oils.

It is also known that polyglycerol esters can be used as lubricants, and find utility in the textile arts.

One drawback of vegetable oil-based or esterified lower molecular weight polyglycerol-based compounds as lubricants is their low viscosity profile, which limits their range of usefulness. The viscosity of vegetable oils may be increased in a variety of ways including bodying (i.e., a controlled oxidation), sulfurization (as disclosed in U.S. Pat. No. 4,885,104) and blending with synthetic oils. Another possibility is to use synthetic polyol esters of polyhydric alcohols such as pentaerythritol, neopentyl glycol and trimethylol propane in total or in combination with vegetable oils (see again, U.S. Pat. No. 4,885,104). Although biodegradable, such esters are still relatively low in viscosity and as such, are limited in utility. Higher viscosities may be achieved by using dibasic acids to increase molecular weight, but biodegradability suffers and the economic and environmental considerations for using such lubricants become increasing less attractive.

A second drawback as noted above is the insolubility of such products in functional fluids.

The applicant has found a simple solution for improving the viscosity profile and solubility of biodegradable functional fluids; this solution includes reacting polyglycerols with fatty acids, triglyceride oils or fats and/or blending the resultant esterified polyglycerols with natural fats and oils.

SUMMARY OF THE INVENTION

The present invention relates to the use of the reaction product of a polyglycerol and either a triglyceride oil or fat, or a fatty acid (or methyl esters thereof) as a high viscosity functional fluid in mud drilling, as low temperature lubricants, cutting fluids, hydraulic fluids, food grade lubricants or as additives for other functional fluids. The reaction products are preferably blended with a natural oil- or fat-based fluids to control or enhance the viscosity of the natural oil- or fat-based fluids.

DETAILED DESCRIPTION OF THE INVENTION

Figure 1:
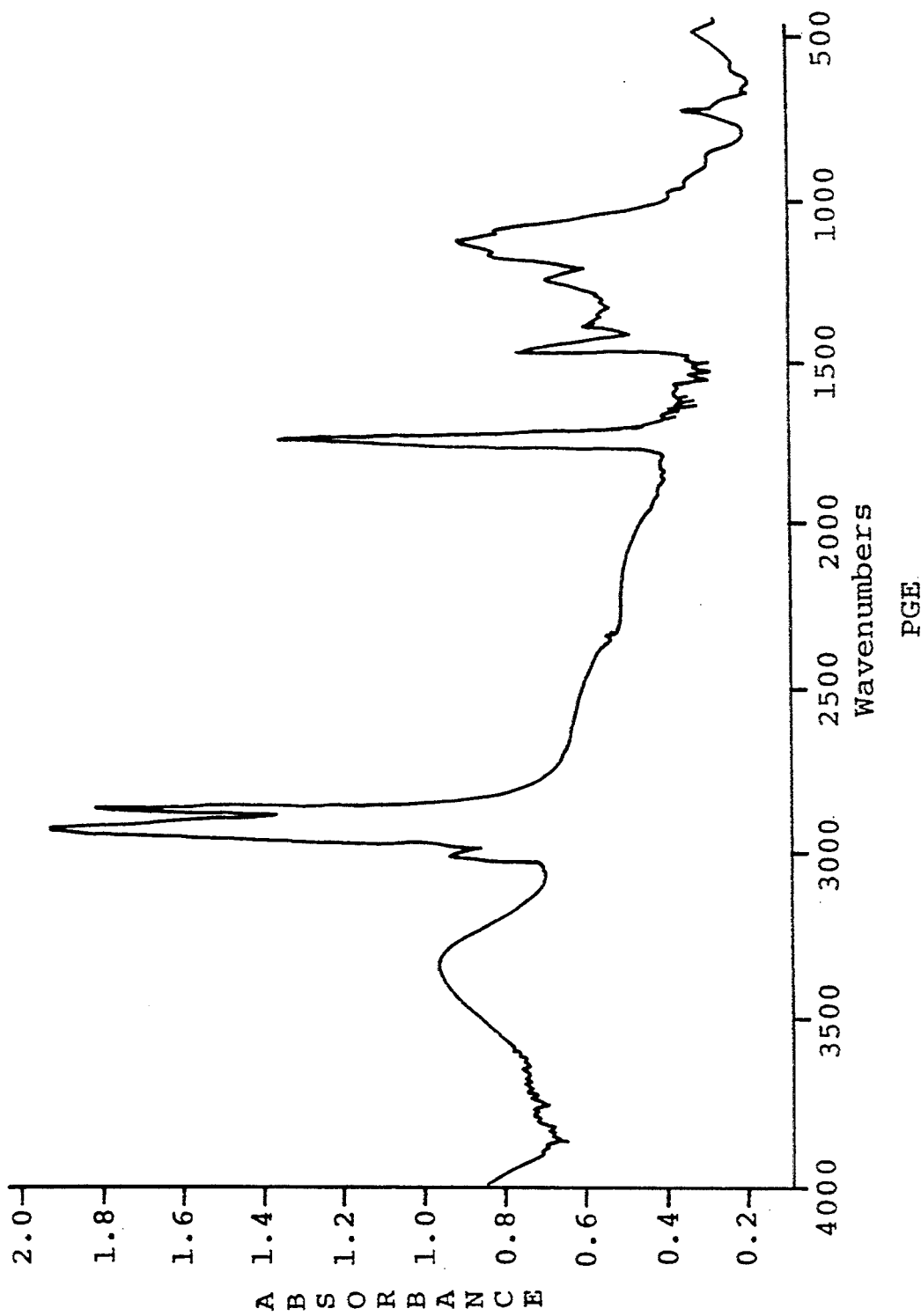
FIG. 1 is an IR Spectra for a canola oil-polyglycerol esterified product.

Glycerol is a polyhydric alcohol, which can be polymerized as disclosed in U.S. Pat. No. 3,637,774, herein incorporated by reference. Polymerization may take place in the presence of an alkaline catalyst such as sodium hydroxide, lithium hydroxide, or potassium carbonate in an anhydrous medium, at a median temperature above 200° C. Water, a product of the reaction, is constantly distilled off during the reaction. In such reactions, a family of polyglycerols ranging from diglycerol,

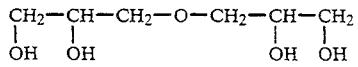

having 4 hydroxyl groups, to compounds of the formula (I):

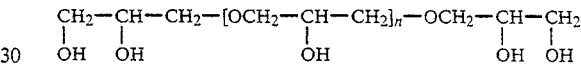

wherein n is equal to 1 to 38 or more are formed. It has been found, by correlating the changes in the hydroxyl value and the viscosity of the polyglycerols as they are formed during the course of the reaction, that the reaction may be stopped at any point depending on the degree of polymerization desired.

Polyglycerols, for n equal to 8 or more are highly viscous and highly polar and thus oil insoluble. In order to improve the solubility of the polyglycerols in oil, the polyglycerols can be esterified with fatty acids or transesterified with methyl esters of fatty acids or triglyceride oils and fats to alter their polarity and their hydrophilic-lipophilic characteristics. It is also observed that as the polyglycerol chain length increases viscosity increases and the hydroxyl value decreases. Viscosities of such larger chain polyglycerols can be further increased by esterification, and because of the molecular length of such larger polyglycerols (e.g., eicosglycerol and docosaglycerol) their viscosity will change (with esterification) without drastically reducing polarity. Depending upon the polyglycerol in question, and the amount of triglyceride oil or fat or fatty acid used, the resulting polyglycerol ester can vary in viscosity and oil solubility. These characteristics of polyglycerol esters of the present invention can be exploited to produce biodegradable, high viscosity polyglycerol ester functional fluids having varying degrees of polarity; these polyglycerol esters can also be used to enhance the viscosity of other functional fluids. The compositions of this invention are also unique in being formulated from naturally occurring components.

The polyglycerol esters of the invention are produced by reacting polyglycerols of formula I above, wherein n is 1 to 100, preferably 1 to 50 and more preferably 1 to 40 with fatty acids, triglyceride oils or triglyceride fats (or methyl esters thereof). The triglycerides reacted with the polyglycerols in accordance with the invention are vegetable oils and animal fats. These triglycerides (or methyl esters thereof) have long chain fatty acids and include, but are not limited to, castor oil, coconut oil, corn oil, cottonseed oil, linseed oil, sesame seed oil, olive oil, palm oil, rapeseed oil, canola oil, safflower oil, soybean oil, peanut oil, sunflower oil, butterfat and lard. Preferably the oil is canola oil. Fatty acid reactants (including methyl ester thereof) include, but are not limited to, lauric acid, palmitic acid, oleic acid, linolenic acid, erucic acid, stearic acid, etc.

Esterification can take place at any or all of the hydroxy groups on the polyglycerol chain. Depending upon the reaction conditions and the ratio of reactant used relative to the polyglycerol, the number of hydroxyl groups which are esterified varies.

The products of the invention have high viscosities at 25° C. i.e., between 1000–3000 cSt or greater. The viscosities will only be limited by the degree of esterification and the value of n in formula I.

The degree of esterification, or the number of hydroxyl groups esterified is obtained by determining the saponification value (SV) and the hydroxyl value (HV). The saponification value is defined as the number of milligrams of potassium hydroxide neutralized during saponification of one gram of ester.

The reaction product of the invention has a saponification value of between 99 and 181 and a hydroxyl value of zero to 387. Preferably the saponification value is between about 100 and 169 and the hydroxyl value is between zero and 324. At least 25% of the hydroxyl moieties of the polyglycerol should be esterified.

The reaction product, depending on its viscosity, can be used as is as a biodegradable lubricant or preferably it is blended with biodegradable triglyceride oils, such as animal fats or vegetable oils, which are currently being used as functional fluids, to improve the viscosity thereof.

In a preferred embodiment of the invention, polyglycerols of n equal to 4–100 in amounts of between 20–45% by weight and preferably 30% by weight are reacted with a vegetable oil or methyl esters thereof in an amount of 80–55% by weight, preferably 70% by weight, to produce a reaction product which is then blended with a triglyceride oil such as an animal fat or a vegetable oil. For instance, the reaction product may be blended with any of the vegetable oils mentioned above or with an animal triglyceride such as butterfat or lard (which is currently used in metal-working fluids). Thus, the triglyceride used as part of the ester reaction product may be the same or may be different from the triglyceride oil or fat which is blended with or improved by the reaction product. A preferred triglyceride oil blended with the reaction product is canola oil. The reaction product as defined above and the subsequent blending of such a product with vegetable oils or animal fats produces completely biodegradable functional fluids formulated from natural ingredients.

EXAMPLE 1

Approximately 374.6 grams (30 parts by weight) of decaglycerol produced according to the method of U.S. Pat. No. 3,637,774 (herein incorporated by reference) were reacted with 874.0 grams (70 parts by weight) of canola oil in the presence 1.8 grams of potassium carbonate and a 50% solution containing 0.6 grams hypophosphorous acid.

The reaction was conducted at 210°–250° C. for about 20 hours; thereafter the reaction product was treated for two hours at 150° C. with 12.5 grams of a synthetic magnesium silicate purifying agent sold under the trademark MAGUSOL HMR-LS, and then filtered.

Approximately 1116.2 grams of a high viscosity canola ester of decaglycerol was obtained (a yield of 89%). The IR Spectra for the product of Example 1 is shown in FIG. 1. EXAMPLE 2

The reaction of Example 1 was repeated at a temperature of 240°–250° C. for 6 hours. A canola ester product in a yield of 95% was obtained, before MAGUSOL purification and filtration. The characteristics of the reaction products of Examples 1 and 2 are reported in Table 1:

TABLE 1

|  | Example 1 | Example 2 |
|---|---|---|
| Color | 10 Gardner | 9 |
| Acid Value | 0.9 | — |
| Saponification value | 138.5 | 143.8 |
| Hydroxyl Value | 182.4 | 177.7 |
| Solubility |  |  |
| in canola oil | soluble | soluble |
| in water | dispersible | dispersible |
| in mineral oil | soluble | soluble |
| Viscosity cSt @ 25° C. | 2421 | 2424 |

The results show that the high viscosity canola oil-decaglycerol esterification reaction is reproducible.

Table 2 is a comparison of the viscosity (cSt) of the product of Examples 1 and 2 to the viscosity of other working fluid esters.

TABLE 2

|  | Canola Oil | Bi-356 | EG-20 | Example 1 | Example 2 |
|---|---|---|---|---|---|
| 25.5° C. | 63.4 cSt | — | — | 2421 | 2424 |
| 40° C. | 37.6 | 225.8 | 26 | 847 | 745 |
| 100° C. | 8.2 | 31.98 | 6 | 46 | — |

Bi-356 is a proprietary polyol ester of Novamont of Milan, Italy and sold under the trade name Matrol Bi-356. Bi-356 is used in functional fluids because of its high viscosity. EG-20 is eicosyl erucate (a long chain monoester).

EXAMPLE 3

Decaglycerol was further polymerized to produce a high viscosity polyglycerol.

Thus, decaglycerol (1737.4 grams; containing potassium carbonate (5.7 grams)) was reacted at 240°–248° C. under a nitrogen gas sparge while removing the water of the reaction. A very viscous product was obtained after about 22 hours of reaction. This product weighed about 1536. grams.

|  | High viscosity polyglycerol | Decaglycerol |
|---|---|---|
| Viscosity @ 180° F. (cps) | 108,000 | 1,400 |
| Refractive Index @ 25° C. | 1.573 | 1.499 |
| Hydroxyl Value | 663 | 904 |

EXAMPLE 4

High Viscosity Polyglycerol Ester

The high viscosity polyglycerol of Example 3, which is completely insoluble in oils, was reacted with canola oil to form an oil-soluble product.

Thus, 343.8 grams of the product of Example 3 and canola oil (802.2 grams) were reacted using potassium carbonate (1.1 grams) at 180°–240° C. for about 7 hours under nitrogen atmosphere with good agitation. The clear product weighed 1140.6 grams.

The properties of this high viscosity polyglycerol canola oil reaction product are listed along with those of the decaglycerol-canola oil reaction product of Example 2.

|  | High viscosity polyglycerol-canola ester | Decaglycerol-canola ester |
|---|---|---|
| Viscosity @ 40° C. (cSt) | 1673 | 745 |
| Saponification Value | 131 | 143.8 |
| Hydroxyl Value | 179.4 | 177.7 |

Figure 2:
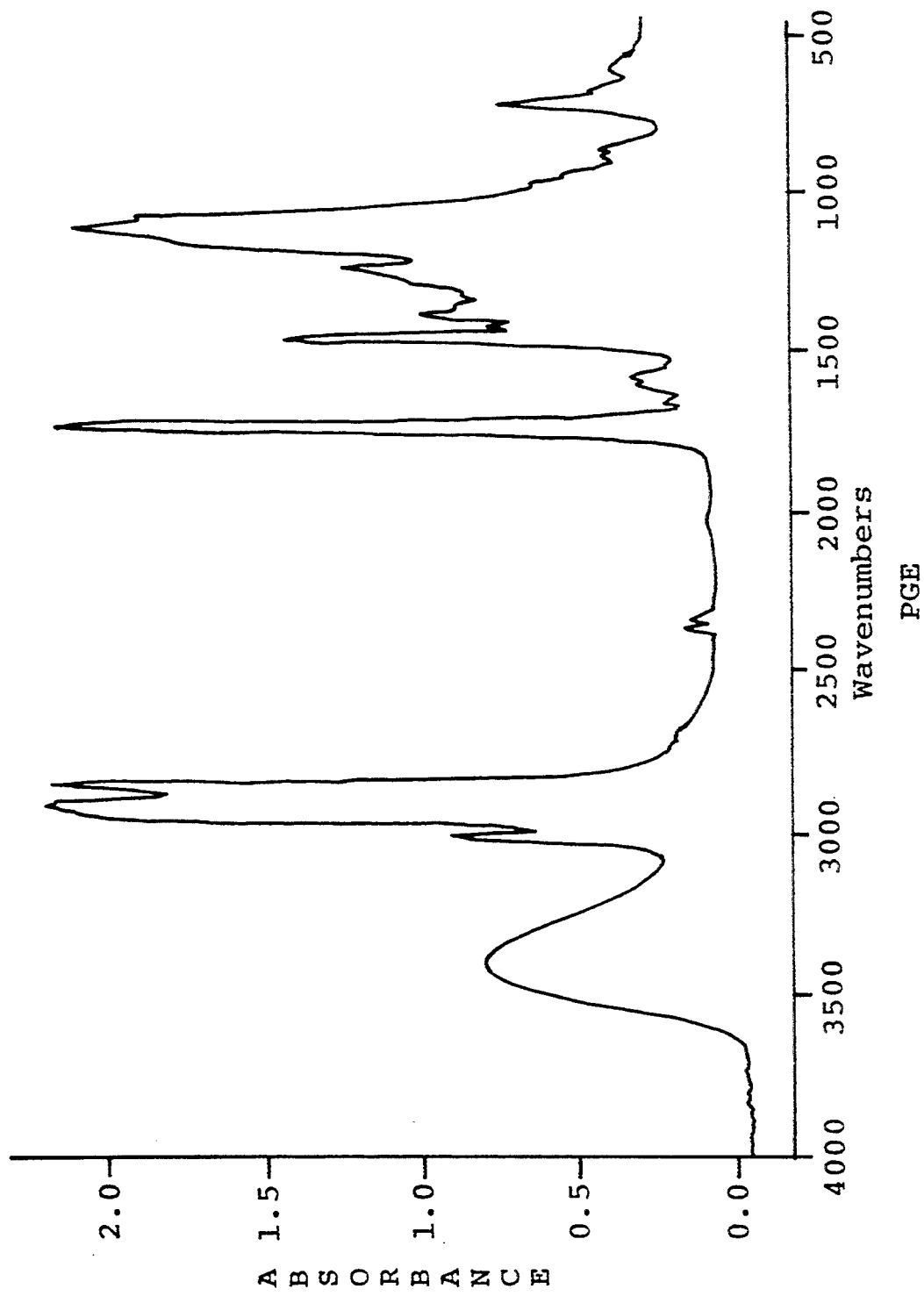
FIG. 2 is an IR Spectra for a very high viscosity canola oil-polyglycerol esterified product.

The IR spectra for this high viscosity product is shown in FIG. 2.

The high viscosity canola oil ester reaction products of this invention can be used as is, as a food-grade lubricant, a cutting oil, a hydraulic fluid and as an additive for mud drilling fluids and chain saw lubricants. For example, the canola oil ester product can be blended with triglyceride-based functional fluids to alter or enhance the viscosities of such fluids. In a particular application, the reaction product of Example 1 was blended with canola oil, which is currently being used, with minor amounts of additives, as a hydraulic fluid. Profiles of the viscosity of canola oil and the viscosity of canola oil blended with different amounts of the reaction product of Example 1 are shown for Examples 5-26 in Table 3.

TABLE 3

| % of the Example 1 product | 0 | 3 | 5 | 10 | 15 | 17 | 18 | 19 | 20 | 25 | 30 |
|---|---|---|---|---|---|---|---|---|---|---|---|
| Viscosity at 40° C. (cSt) | 33.8 | 36.8 | 36.5 | 37.9 | 44.7 | 45.7 | 46.1 | 48.2 | 49.2 | 54.6 | 60.7 |
| % of the Example 1 product | 35 | 36 | 37 | 37.5 | 40 | 45 | 46.5 | 48 | 50 | 55 | 60 |
| Viscosity at 40° C. (cSt) | 67.6 | 71.1 | 73.4 | 74.6 | 81.6 | 93.9 | 94.8 | 100 | 106.7 | 123.7 | 148.2 |

From the above, it is evident that the reaction product is completely soluble in canola oil and that the viscosity of canola oil can be advantageously altered by the addition of varying amounts of the reaction product. The mixture is also biodegradable. The reaction product can be added to the canola oil by pouring the glycerol ester liquid into canola oil or vice-versa either at ambient temperatures or elevated temperatures with stirring.

Changes in the polarity and the hydrophilic characteristics of a particular blend or mixture of a reaction product and oil can be made by using as reactants, in the esterification reaction, polyglycerols having greater chain lengths or esters of the triglyceride oil.

For example, the methyl ester of a fatty acid, vegetable oil or animal fat can be reacted in a transesterification reaction with a particular polyglycerol to produce a more hydrophobic product than the products of the Examples as reported above.

EXAMPLE 27

Thirty parts by weight of decaglycerol was reacted with 70 parts by weight of the methyl ester of canola oil in the presence of $K_2CO_3$ catalyst. Methanol was continually recovered from the transesterification reaction. The product yield was approximately 99%. Unlike the esterification reaction of the Examples 1 and 2 the methyl ester reaction produces only decaglycerol esters without producing mono and diglycerides.

The properties of the product of Example 27 are listed below:

| Hydroxyl Value | 155.7 |
|---|---|
| SV | 139.5 |
| Viscosity of 35% of product in canola oil | 63.5 cSt at 40° C. |

The product of Example 27 is more hydrophobic and has a lower hydroxyl value then the products of Examples 1 or 2.

From the above, it is seen that vegetable oil esters of polyglycerol possess very high viscosities, are miscible with working fluids and are useful in formulating biodegradable working fluids.

What is claimed is:

1. A method for lubricating the moving parts of a mechanical device which comprises applying to said moving parts a polyglycerol ester which is the reaction product of a polyglycerol containing three or more glycerol monomers and a member selected from the group consisting of a fatty acid, methyl esters thereof, a triglyceride and methyl esters thereof; said reaction product having a saponification value of between 100 and 169.

2. The method of claim 1, wherein the polyglycerol ester is the reaction product of a polyglycerol containing ten or more glycerol monomers.

3. The method of claim 1, wherein the triglyceride of the reaction product is selected from the group consisting of castor oil, coconut oil, corn oil, cottonseed oil, linseed oil, sesame seed oil, olive oil, palm oil, rapeseed oil, canola oil, safflower oil, soybean oil, peanut oil, sunflower oil, butter fat, and lard.

4. The method of claim 1, wherein the reaction product is produced by reacting a triglyceride, or a methyl ester derivative thereof, in amounts between 55 to 80% by weight with between 20 to 45% by weight of said polyglycerol.

5. The method of claim 1, wherein the reaction product is produced by reacting a polyglycerol containing 10 or more glycerol monomers with canola oil, or a methyl ester derivative of canola oil.

6. The method of claim 1, wherein the fatty acid of the reaction product is selected from the group consisting of lauric acid, palmitic acid, oleic acid, linolenic acid, erucic acid, and stearic acid and methyl esters thereof.

7. The method of claim 1, wherein the polyglycerol ester is the reaction product of a polyglycerol containing four or more glycerol monomers.

8. A method for lubricating the moving parts of a mechanical device which comprises applying to said moving parts a blend of
   i) a polyglycerol ester which is the reaction product of a triglyceride or a fatty acid and a polyglycerol containing three or more glycerol monomers and the reaction product has a saponification value of between 99 and 181, and ii) a triglyceride based functional fluid in which the triglyceride of ii) may be the same or different than the triglyceride of the reaction product of i).

9. The method of claim 8, wherein the reaction product is present in the amount of between 5 and 95%.

10. The method of claim 1, wherein the triglyceride based functional fluid is an animal fat or a vegetable oil.

11. The method of claim 8, wherein the triglyceride of the reaction product is selected from the group consisting of castor oil, coconut oil, corn oil, cottonseed oil, linseed oil, sesame seed oil, olive oil, palm oil, rapeseed oil, canola oil, safflower oil, soybean oil, peanut oil, sunflower oil, lard and butterfat.

12. The method of claim 8, wherein the reaction product is composed of decaglycerol and canola oil and the triglyceride based functional fluid comprises a triglyceride selected from the group consisting of castor oil, coconut oil, corn oil, cottonseed oil, linseed oil, sesame seed oil, olive oil, palm oil, rapeseed oil, canola oil, safflower oil, soybean oil, peanut oil, sunflower oil, lard and butterfat.

13. The method of claim 8, wherein the reaction product is composed of 20–45% by weight of the polyglycerol and 80–55% by weight of canola oil.

14. The method of claim 8, wherein the triglyceride based functional fluid of ii) comprises canola oil.

15. The method of claim 8, wherein the fatty acid of the reaction product is selected from the group consisting of lauric acid, palmitic acid, oleic acid, linolenic acid, erucic acid, and stearic acid.

16. The method of claim 8, wherein the reaction product has a viscosity of 1000 cSt or greater at 25° C.

* * * * *